Patented Oct. 19, 1943

2,331,985

UNITED STATES PATENT OFFICE 2,331,985

CHLORINATION OF RUBBER

Walter M. Kutz, Pittsburgh, Pa., and George Arthur Webb, Akron, Ohio, assignors to The Raolin Corporation, New York, N. Y., a corporation of West Virginia No Drawing. Application August 1, 1940, Serial No. 349,280

5 Claims. (Cl. 260—772)

This invention relates to chlorination of rubber; and it comprises an improved process of making rubber chloride of high chlorine content, good stability and other desirable properties, wherein rubber in substantially anhydrous solution is chlorinated to a combined chlorine content of about 50 per cent to 60 per cent, advantageously at atmospheric pressure, and is then further chlorinated under superatmospheric pressure, such as 25 pounds to 50 pounds gage pressure, to produce a stable final product containing more than 64 per cent, and advantageously 65 to 66 per cent, fixed chlorine, said product being recovered from the solution in any desired manner; the application of superatmospheric pressure during the final stages of chlorination having the effect of expediting and completing chlorination to the desired final chlorine content, and of making this product available more economically than was heretofore possible; all as more fully hereinafter set forth and as claimed.

It is known that various useful reaction products of chlorine and rubber, known generally as rubber chlorides or chlorinated rubbers, can be prepared under various conditions. These materials are useful in varnishes, plastics, etc., and their properties vary somewhat with the conditions maintained during the reaction. In a general way, the greater the chlorine content of the product, the more stable it is and the more desirable are its other properties.

Chlorination of rubber is most advantageously effected in dilute solution, as this makes possible the most uniform chlorination and facilitates the attainment of relatively high chlorine contents. Dilution is important, since serious difficulties are encountered in attempting to chlorinate rubber in more concentrated form, either in the liquid or solid state. Chlorination of rubber solutions is ordinarily effected at atmospheric pressure, and sometimes at the boiling point or at another controlled temperature. Numerous procedures for chlorinating in this general manner have been proposed. A desirable process in which rubber is chlorinated in a dilute substantially anhydrous solution is described in North Patent 2,148,830; and an improved form of this procedure is described in a copending Raynolds application, Serial No. 245,293.

It is well known that rubber in the form of suitably dilute solutions is quite readily chlorinated to a fixed chlorine content of about 55 to 60 per cent. Chlorination to this extent can be effected at substantially any temperature; temperatures from −15° C. to the boiling point of the solvent (e. g., carbon tetrachloride boiling at 76° C.) being sometimes employed. It is also known, however, that it is considerably more difficult to continue the chlorination beyond 60 per cent, to obtain final products containing more than 64 per cent fixed chlorine.

Chlorinated rubbers containing more than 64 per cent chlorine, and advantageously at least 65.13 per cent chlorine, are considerably more stable and desirable for most applications than related products of lower chlorine content. The heptachloride having the theoretical formula $C_{10}H_{13}Cl_7$, and containing 65.13 per cent chlorine, is a highly desirable product, and even higher chlorine contents are sometimes desirable. The heptachloride is thought to contain 4 chlorine atoms which are added at the double bonds of the rubber molecule, which is considered to be the dimer of isoprene, $C_{10}H_{16}$. It also contains 3 chlorine atoms which are substituted for hydrogen in the rubber molecule. In more highly chlorinated products, more chlorine is substituted for hydrogen.

It has been found difficult to carry the chlorination of rubber to the heptachloride stage under the normal operating conditions, which suffice for rapid chlorination to a chlorine content of nearly 60 per cent. Chlorination beyond this point is, as noted, quite slow. Various methods of increasing the rate of reaction during this stage have been suggested, and several of them are beneficial. However, in these methods previously suggested, it has generally been necessary to maintain the solvent, such as carbon tetrachloride, at the boiling point, in order to provide a sufficiently rapid rate of reaction during chlorination from about 55 per cent chlorine content to a content of 64 per cent or more. And when chlorination is effected at the boiling point of the solvent, a serious disadvantage is encountered. Partially chlorinated rubber deposits as a film on the walls of the reaction vessel.

The disadvantage of this film deposition is readily understood. Once a film has been formed on the walls of the vessel, more heat must be applied to overcome the insulating effect. This generally results in some decomposition of the partially chlorinated film, which is not stable because of its relatively low chlorine content. The film also tends to increase in thickness during further heating of the solution, and is thus cumulative in its effect in preventing proper heat transfer. The formation of these films necessitates frequent cleaning of the reaction vessel, which introduces a substantial waste of material and a loss of time. These difficulties are quite serious in commercial operations, and greatly reduce the economy of otherwise useful procedures.

One object achieved by this invention is the prevention of this film formation and subsequent decomposition on the walls of the reaction vessel. We have found that this is readily accomplished by conducting the final stages of chlorination under a pressure sufficiently high to prevent boiling of the solvent at the desired operating temperature. For example, a gage pressure of 25 pounds per square inch makes it possible to operate at temperatures of 80 to 85° C., using carbon tetrachloride as the solvent, without boiling or film formation. A pressure of 50 pounds per square inch (gage) is sufficient to permit operating at a temperature of 100° C. without boiling or film formation. Higher pressures make possible higher operating temperatures, but temperatures above 100° C. are seldom desirable in the production of chlorinated rubber of the light color which is usually wanted. In general, it is advantageous to maintain the pressure during the final chlorination sufficiently high so that the operating temperature is approximately 20° C. below the boiling point of the solvent at the pressure maintained.

In addition to the advantages of completing the chlorinating reaction under pressure in preventing film formation and decomposition, and discoloration and loss of the product, we have also found that when chlorination from a fixed chlorine content of about 55 to 60 per cent to a final chlorine content of about 65 per cent is effected under pressure, this final chlorination is accomplished with a maximum economy of chlorine, and in a satisfactorily short time. The excess of chlorine above the theoretical requirements, which is necessarily employed in prior methods of chlorinating in solution, may be sharply reduced when the final chlorination is effected under pressure in accordance with this invention.

Chlorination under pressure is especially effective and desirable for the final stages of the reaction, after a fixed chlorine content of some 50 to 60 per cent has been obtained at normal pressure. Prior to that stage, chlorination by substitution occurs to a substantial extent, and a large volume of hydrogen chloride is evolved. From a chlorine content of some 50 or 60 per cent up to a final chlorine content of about 65 per cent, chlorination proceeds mainly by addition, with little or no evolution of hydrogen chloride. The application of pressure at this stage accelerates the addition reaction, and is not complicated by the evolution of HCl.

In more detail, most authorities agree that during the chlorination of rubber in solution, the substitution reaction at least partially precedes the addition reaction. In our investigations of this reaction, we have found that when chlorination at normal pressure slows down, which is usually at a fixed chlorine content of 55 to 60 per cent, the substitution reaction is substantially complete for a product containing about 65 per cent of fixed chlorine. As noted, this product is assumed to be the heptachloride, $C_{10}H_{13}Cl_7$, containing four added chlorine atoms and three substituted. A representative series from the numerous tests in which this was established resulted in the data in the following table:

| Run No. | Total grams of rubber | Total grams of chlorine | Grams chlorine added | Grams chlorine substituted | Fixed chlorine content |
|---|---|---|---|---|---|
| 1 | 136 | 50 | None | 25.0 | 14.5 |
| 2 | 136 | 98 | 22 | 33.0 | 30.9 |
| 3 | 136 | 140 | 52 | 44.0 | 42.8 |
| 4 | 136 | 200 | 72 | 64.0 | 49.7 |
| 5 | 136 | 230 | 80 | 90.0 | 54.8 |
| 6 | 136 | 300 | 90 | 105.0 | 58.4 |

In these tests, the rubber was chlorinated in solution in carbon tetrachloride under carefully controlled conditions. The reaction temperature was maintained below 50° C. by cooling the reaction vessel. The chlorine was carefully weighed and only traces of unreacted chlorine were found in the exit gas.

From these data, it is readily seen that at the beginning of chlorination, substitution precedes addition. In the stage between 30 per cent fixed chlorine content and 50 per cent fixed chlorine content, the addition reaction proceeds more rapidly. Above 50 per cent fixed chlorine, the addition reaction again lags, while substitution progresses more rapidly. Under the conditions in the above series of tests, run No. 6 resulted in the substitution of 105 grams of chlorine per mole of rubber. The theoretical substituted chlorine content of one mole of $C_{10}H_{13}Cl_7$ is 106.35 grams. Hence, in chlorination under atmospheric pressure at temperatures below 50° C., the substitution reaction for the production of the heptachloride is substantially completed at a fixed chlorine content of 58.4 per cent. All that remains to be done is to complete the addition phase of the reaction. This, as noted, is extremely slow at normal pressures.

At substantially this stage, pressure chlorination is started in accordance with the present invention. Between 30 and 40 per cent of the chlorine combined by addition must be fixed during this operation under pressure.

When so operating, it is advantageous that the temperature of the solution prior to the application or pressure be kept below 50° C. This does not materially reduce the reaction rate in chlorinating up to 50 or 60 per cent fixed chlorine, and it has the advantage that enough chlorine can be dissolved in the solution to complete the reaction when the temperature and pressure are raised. In operating in accordance with our invention, therefore, it is customary to chlorinate in a vented vessel at atmospheric pressure and at a temperature below 50° C., until a fixed chlorine content of about 55 per cent is reached. The point when it becomes desirable to apply pressure is generally indicated by a marked drop in the temperature of the reaction vessel. The solution is then saturated with chlorine and the system is closed, while the temperature and pressure are rapidly raised to the desired point.

In order to keep the solvent below the boiling point at all times, it is often desirable to produce some initial pressure in the vessel by introducing air or other inert gas which is insoluble and non-reactive with the solvent and the chlorine under the conditions of operation. By heating the vessel with or without the initial introduction of an inert gas, the pressure is then raised, usually to the range from 25 to 50 pounds, gage. As noted, the reaction temperature should be approximately 20° C. below the boiling point of the carbon tetrachloride, or other solvent, at the operating pressure.

While our process is advantageous in the chlorination of any type of rubber cement in any chlorine-resistant solvent, we find that especially useful results are obtained in the chlorination of anhydrous rubber cements using carbon tetrachloride as a solvent. In addition to the chlorination of caoutchouc, we can also chlorinate any rubber, including synthetic rubber, reclaimed rubber, gutta percha or balata and related gums, in accordance with this invention.

We have found that the final chlorination of rubber solutions under pressure in accordance with this invention gives products of good stability and high uniformity, while using substantially the theoretical amount of chlorine. Our process is also more rapid than other known processes of chlorinating rubber in solution. However, previously known methods of expediting the chlorinating reaction may be employed in conjunction with our invention, if desired, and such procedures are often useful, especially in the early stages of chlorination.

In one specific embodiment of the invention, 465 pounds of carbon tetrachloride were charged into a glass-lined cement-making vessel, equipped with an agitator and connected with a reflux condenser. Ten pounds of purified rubber containing less than 0.1 per cent nitrogen were added. The rubber and solvent were agitated together, and heated with the reflux open to the atmosphere, until a uniform cement having a viscosity of 25 cps. at 25° C. was obtained. A small amount of solvent was then distilled off through the condenser to drive out of the system any traces of moisture introduced with the rubber or the solvent. Such moisture is eliminated from the vessel by azeotropic distillation, and sometimes collects in the condenser.

The rubber cement was then pumped to a glass-lined reaction vessel, fitted with a reflux condenser, a recording thermometer, a vent to an acid absorbing system for recovering HCl, a chlorine feed line, an air pressure line, an agitating mechanism and a jacket with connections for cooling or heating. Cooling water was circulated through the jacket while the warm cement was quickly cooled to a temperature of about 20° C. Twenty-seven pounds of chlorine were then introduced during a period of 2.75 hours. The temperature rose rapidly at first to about 50° C., and then dipped sharply. This indicated the slowing of the chlorinating reaction and the formation of an intermediate product containing about 55 per cent fixed chlorine. This product is not soluble in carbon tetrachloride at temperatures below about 60° C. and at lower temperatures it comes out of solution rapidly, causing a super-cooling of the solution. At this stage, the temperature of the vessel drops 10 or 15° in about 15 minutes, which is advantageous, since a high rate of chlorine input can be maintained. Meanwhile, HCl gas is continuously vented, with scarcely a trace of chlorine passing from the reaction vessel. Carbon tetrachloride has little affinity for HCl, and with suitable agitation and the relatively high chlorine input rate, substantially all of the HCl is driven out of the system by the end of the initial chlorinating period of about 2 to 3 hours.

When this stage is reached, the reflux condenser is closed by means of a valve, and the chlorine inlet line is closed. Dry air is admitted to the vessel above the surface of the pot liquid until a pressure of about 25 pounds per square inch is indicated on the gage. Steam is then circulated through the jacket of the vessel, while the pot temperature is raised to about 85° C. This requires about one hour, and the reaction vessel is held under pressure and at this temperature for about two hours more. Chlorination is completed during this period.

A sample of the pot liquor was then withdrawn and precipitated with methanol, and the product was dried and analyzed. It contained 65.3 per cent of fixed chlorine. Thus, in 5¾ hours, a stable, highly chlorinated product was produced with a chlorine consumption only about 2 per cent above theoretical.

The pressure on the reaction vessel was gradually released, and the acidity of the pot liquor was found to be about 0.06 per cent, determined as HCl. After a brief blowing with dry air at 2 pounds pressure, the acidity was reduced to about 0.01 per cent as HCl. This acidity is largely due to residual chlorine, with possible traces of HCl. It may be further reduced if desired.

The substantially neutral pot liquor was then treated with water in known manner to precipitate rubber chloride in solid form, which was recovered and dried. This product was of very light color and had excellent heat stability. A 20 per cent solution in toluol heated on a water bath of 90° C. required 20 minutes to produce a color change with moist Congo red paper. The rubber chlorides produced by procedures previously known generally produce a color change with Congo red paper within ten minutes, indicating lower heat stability than the product made in accordance with this invention.

After completion of the preparation of this rubber chloride, the top of the reaction vessel was removed to permit examination of the inner surface. There was no evidence of any burning and no deposited film of decomposed product. As noted, these undesirable results were generally obtained in prior processes of chlorinating rubber in solution at atmospheric pressure. More than 25 consecutive runs have been made in the same reaction vessel by the procedure described, without any film deposition or evidence of decomposition on the inner surface of the vessel. Thus our invention eliminates the necessity of frequent cleaning of the reaction vessel. The resulting saving in time and materials is substantial, and with this must be considered the advantage of the exceptional heat stability of the product produced in accordance with this invention.

What we claim is:

1. A process for preventing film formation in the production of chlorinated rubber containing above 64 per cent fixed chlorine, which comprises treating a dilute, substantially anhydrous solution of rubber with gaseous chlorine at substantially atmospheric pressure until chlorinated rubber containing from 50 to 60 per cent fixed chlorine is formed in the solution, and further chlorinating said preparation while maintaining the mixture at a temperature above its boiling point at atmospheric pressure and under a pressure sufficiently above atmospheric to prevent boiling of the solvent and film formation, and until a chlorinated rubber containnig above 64 per cent chlorine is obtained.

2. The method of claim 1 wherein the said further chlorination is carried out in the presence of carbon tetrachloride as a solvent at a temperature above 80° C. and at a pressure above about 25 pounds per square inch gage.

3. The process as defined in claim 1 wherein the operating temperature is approximately 20° below the boiling point of the solvent at the pressure maintained.

4. The process as defined in claim 1 wherein the chlorine is added to the chlorinated rubber containing 50 to 60 per cent of chlorine, in sufficient quantity to complete the reaction and wherein said further chlorination step is carried out in a closed container without the addition of further chlorine.

5. A process for preventing film formation in the production of chlorinated rubber containing above 64 per cent fixed chlorine, which comprises treating a dilute, substantially anydrous solution of deproteinized rubber containing less than 0.1 per cent of nitrogen, with gaseous chlorine at substantially atmospheric pressure until chlorinated rubber containing from 50 to 60 per cent fixed chlorine is formed in the solution, and further chlorinating said preparation while maintaining the mixture at a temperature above its boiling point at atmospheric pressure, and under a pressure sufficiently above atmospheric to prevent boiling of the solvent and film formation, eand until a chlorinated rubber containing above of 64 per cent chlorine is obtained.

WALTER M. KUTZ.
GEORGE ARTHUR WEBB.